Figure 1:
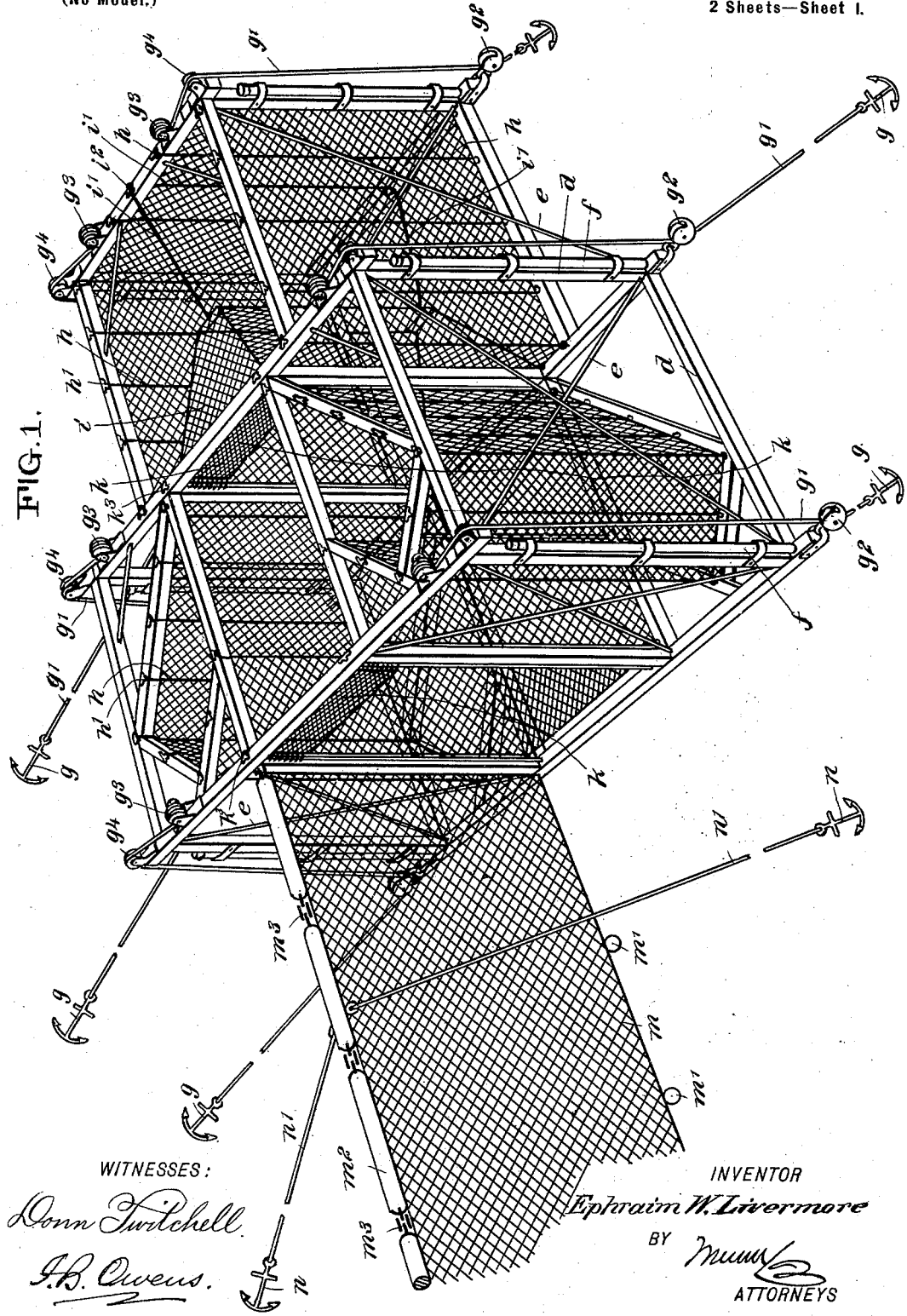

No. 692,057. Patented Jan. 28, 1902.
E. W. LIVERMORE.
FISH TRAP.
(Application filed May 3, 1901.)

(No Model.) 2 Sheets—Sheet 1.

WITNESSES:
Donn Twitchell.
J.B. Owens.

INVENTOR
Ephraim W. Livermore
BY
ATTORNEYS

THE NORRIS PETERS CO., PHOTO-LITHO., WASHINGTON, D. C.

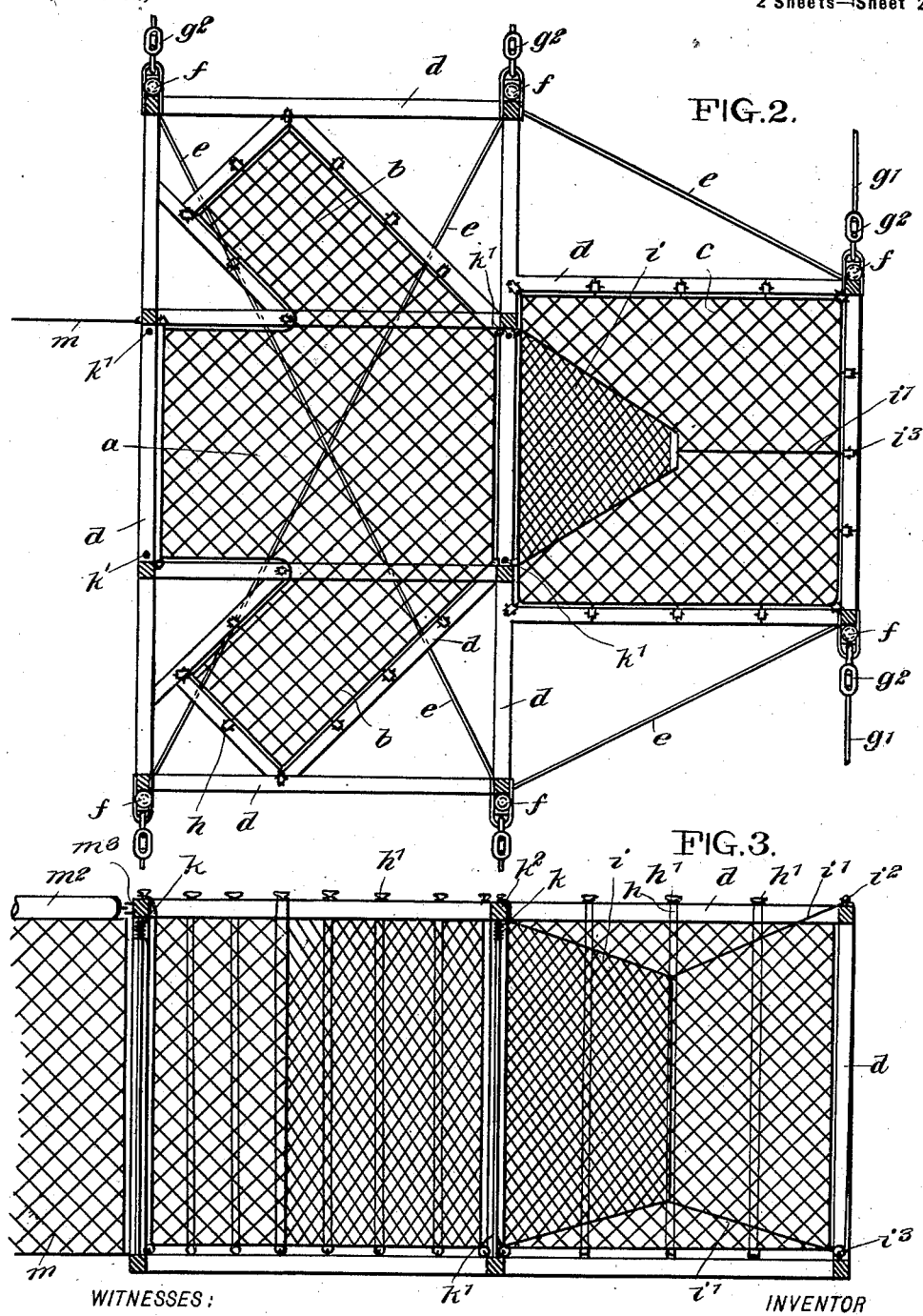

UNITED STATES PATENT OFFICE.

EPHRAIM WILLARD LIVERMORE, OF NEW WHATCOM, WASHINGTON.

FISH-TRAP.

SPECIFICATION forming part of Letters Patent No. 692,057, dated January 28, 1902.

Application filed May 3, 1901. Serial No. 58,621. (No model.)

*To all whom it may concern:*

Be it known that I, EPHRAIM WILLARD LIVERMORE, a citizen of the United States, and a resident of New Whatcom, in the county of Whatcom and State of Washington, have invented a new and Improved Fish-Trap, of which the following is a full, clear, and exact description.

This invention relates to a fish-trap of that class which is designed to be floated in the water and anchored to hold it in the proper place.

The trap comprises a lead, a heart, and a crib, with certain peculiar features of construction producing a trap efficient in every respect.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a perspective view of the invention. Fig. 2 is a horizontal section thereof, and Fig. 3 is a section taken in line with the lead.

The trap has a rigid framework built, preferably, of wood, so that the netting may be hung to form the heart, which comprises the central part $a$, with the diagonal wings $b$ and the crib $c$, which is in line with the central part of the heart. The various parts of the framing are indicated by the letter $d$. The framing $d$ is braced to insure its rigidity by diagonal tie-rods $e$, connecting the various parts thereof, as shown in the drawings. For regulating the depth at which the trap floats, I provide a number of ballast-tubes $f$, which are fastened securely to vertical portions of the frame $d$ and open at their upper ends. Into these tubes water may be pumped, so as to sink the frame, and if it be desired to float the frame higher upon pumping out this water the buoyancy of the frame will be increased. The trap is held in the proper position by anchors $g$, the lines $g'$ of which pass over blocks $g^2$, secured to the bottom of the frame and thence upward to winches $g^3$, mounted on the top of the frame, by which winches the lines $g'$ may be hauled, so as to change the position of the trap or to take up slack in the lines, as will be understood. In passing over the upper corners of the frame $d$ the lines $g'$ run on sheaves $g^4$, mounted at the top of the frame, as shown.

The various sections of netting constituting the walls of the heart and crib are mounted so that they may be moved up and down on suitable guide-rods carried by the frame $d$, and for the purpose of so adjusting the netting lines $h$ are provided, such lines passing from the bottom of the netting upward to the top of the frame and being engaged with cleats $h'$ thereon, whereby the lines are held.

$i$ indicates the tunnel, which leads from the inner end of the body portion $a$ of the heart into the crib $c$. This tunnel is fastened to the frame $d$ adjacent to the heart and has its small end held in proper position by lines $i'$, which pass, respectively, from its upper and lower ends and which are fastened to a cleat $i^2$ on the top of the frame $d$, the lower line $i'$ being passed first to the bottom of the frame and then over a sheave $i^3$, (see Fig. 3,) from which point such line $i'$ is passed upward to the cleat $i^2$, before referred to. By hauling taut these lines $i'$, the tunnel $i$ may be held stretched in proper adjustment. At the outer opening of the main part $a$ of the heart—that is to say, at the opening which communicates with the open water—and at the opening between the body $a$ of the heart and the crib $c$ I provide aprons of netting $k$. These aprons are movable up and down, so as to extend across the openings and close them or to be raised above the openings, leaving them unobstructed. Such aprons $k$ are mounted on guide-rods $k'$, held vertically by the frame $d$ and connected with lines $k^2$, which pass upward to the top of the frame and are secured thereto by engagement with cleats $k^3$, similar to the cleats $h'$, mentioned before. These aprons are of course provided with downhaul lines as well as uphaul lines. Owing to the difficulty of illustrating the exact arrangement of these lines I have not attempted to show them in the drawings; but since they are commonly employed in the art they will be readily understood by persons skilled therein.

The lead $m$ is formed of the usual mesh and provided at its bottom with weights $m'$ for sinking it. At its top the lead is sustained on the surface by boom-floats $m^2$, connected together by chains or the like $m^3$, as shown. The lead is attached to the framing of the trap at one side of the opening into the heart. Anchors $n$ and cables $n'$ are employed for holding the lead properly disposed.

The trap thus constructed presents the least possible resistance to the passage of the tidal currents consistent with that degree of strength which of course is necessary. It may be floated at any elevation desired by the proper disposition of water in the ballast-tubes $f$, and by means of the peculiar arrangement of winches and anchors and lines the trap may be easily adjusted exactly to the position desired. By manipulating the aprons $k$ any part of the trap may be fished to the exclusion of the other parts, as may suit the conditions of the fishing. The entire trap may be cut off by closing the apron at the receiving-opening of the heart-body $a$. If any one of the divisions $b$ and $c$ of the trap be in need of repair, these divisions may be individually closed without putting the entire trap out of operation.

By constructing a rigid buoyant frame such as I have provided and attaching the anchor-cables to the bottom thereof it is possible for me to anchor the tray in very rapid currents and to hold it in place without fear of the trap riding under or becoming racked by the strain to which it is necessarily subjected. This obvious result could not be attained by attaching the anchor-ropes to the top of the frame.

Having thus described my invention, I claim as new and desire to secure by Letters Patent—

1. A fish-trap having a block at its lower portion, and a winding device at its upper portion, the block serving to have the anchor-cable engaged therewith and passed upward to the winding device.

2. The combination with a floating fish-trap, of guide devices at the lower portion thereof, an anchor-rope run through the guide devices and passed upward to the top of the trap, and a winding device at the top of the trap for the anchor-rope.

3. In a fish-trap, the combination of a rigid buoyant frame, netting held by the frame to constitute the walls and passages of the trap, and means for anchoring the trap in a body of water, said means comprising anchor-cables joined to the lower portion of the frame, for the purpose specified.

4. In a fish-trap, the combination of a rigid buoyant frame, netting carried by the frame to form the walls and passages of the trap, guide devices at the bottom of the frame, winding devices at the top of the frame, and carrying means comprising cables rove through the guide devices and passed upward to the winding devices.

In testimony whereof I have signed my name to this specification in the presence of two subscribing witnesses.

EPHRAIM WILLARD LIVERMORE.

Witnesses:
HENRY L. WOLCOTT,
GEO. C. FISHER.